(12) United States Patent
Henry et al.

(10) Patent No.: US 7,614,428 B2
(45) Date of Patent: Nov. 10, 2009

(54) POWER STEERING HOSE DESIGN FOR PERFORMANCE IN HIGH PRESSURE AND LOW TO HIGH VOLUMERIC EXPANSION ENVIRONMENTS

(75) Inventors: Brian Henry, Sun Prairie, WI (US); John Donald Wendt, Cottage Grove, WI (US)

(73) Assignee: Veyance Technologies, Inc., Fairlawn, OH (US)

( * ) Notice: Subject to any disclaimer, the term of this patent is extended or adjusted under 35 U.S.C. 154(b) by 359 days.

(21) Appl. No.: 11/616,599

(22) Filed: Dec. 27, 2006

(65) Prior Publication Data
US 2008/0156387 A1 Jul. 3, 2008

(51) Int. Cl.
*F16L 11/00* (2006.01)
(52) U.S. Cl. .................. 138/124; 138/123; 138/125; 138/129; 138/130; 138/132
(58) Field of Classification Search ......... 138/123–127, 138/129, 130, 132
See application file for complete search history.

(56) References Cited

U.S. PATENT DOCUMENTS

| | | | | |
|---|---|---|---|---|
| 4,662,405 A | * | 5/1987 | Besche et al. ............... | 138/125 |
| 4,870,995 A | * | 10/1989 | Igarashi et al. .............. | 138/126 |
| 4,905,735 A | * | 3/1990 | Akiyoshi .................... | 138/126 |
| 4,952,262 A | * | 8/1990 | Washkewicz et al. ........ | 156/149 |
| 5,445,191 A | * | 8/1995 | Green et al. ................ | 138/126 |
| 6,092,554 A | | 7/2000 | Pyle et al. ................... | 138/118 |
| 6,244,303 B1 | | 6/2001 | Adams ........................ | 138/129 |
| 6,394,506 B1 | | 5/2002 | Street ......................... | 285/256 |
| 6,440,512 B1 | | 8/2002 | Thomas et al. ............. | 428/36.91 |
| 6,464,916 B2 | | 10/2002 | Tyson ......................... | 264/150 |
| 6,530,609 B1 | | 3/2003 | Chatterton .................. | 285/420 |
| 6,631,742 B1 | | 10/2003 | Hagiwara et al. .......... | 138/126 |
| 6,701,968 B2 | | 3/2004 | Bolonhezi ................... | 138/132 |
| 6,883,551 B2 | * | 4/2005 | Bourgois et al. ........... | 138/127 |
| 6,907,906 B1 | | 6/2005 | Cook et al. ................. | 138/109 |
| 6,921,565 B2 | | 7/2005 | Saupe et al. ............... | 428/36.91 |
| 7,029,736 B2 | | 4/2006 | Ainsworth ................. | 428/36.91 |
| 7,044,168 B2 | | 5/2006 | Wilson et al. .............. | 138/126 |
| 2005/0136203 A1 | | 6/2005 | Henry ........................ | 428/36.2 |

FOREIGN PATENT DOCUMENTS

EP            1544528            6/2005

* cited by examiner

*Primary Examiner*—Patrick F Brinson
(74) *Attorney, Agent, or Firm*—Roger D. Emerson; Daniel A. Thomson; Emerson, Thomson & Bennett, LLC

(57) ABSTRACT

A new and improved power steering hose assembly is described, which may comprise a core hose layer, a first reinforcing layer, an intermediate hose layer, a second reinforcing layer and an outer hose layer. The first reinforcing layer has a braid pattern formed in a 1-over, 1-under pattern. The intermediate hose layer is positioned over the first reinforcing layer. The second reinforcing layer is disposed over the first reinforcing layer. The second reinforcing layer has a braid pattern formed in one of a 3-over, 3-under pattern or a 2-over, 2-under braid pattern. The outer hose layer is positioned over the second reinforcing layer.

16 Claims, 8 Drawing Sheets

POWER STEERING HOSE DESIGN FOR PERFORMANCE IN HIGH PRESSURE AND LOW TO HIGH VOLUMERIC EXPANSION ENVIRONMENTS

I. BACKGROUND OF THE INVENTION

A. Field of Invention

This invention pertains to the art of methods and apparatuses for power steering hose designs for performance in high pressure and low to high volumetric expansion environments.

B. Description of the Related Art

Reinforced power steering hose is well known in industry for use in transporting fluids under pressure, particularly in automotive power steering hose applications. These hose assemblies generally comprise a polymeric core hose layer and one or more reinforcing layers formed from strands of fiber or wire material that are braided over the core layer. In most applications, the hose also includes an intermediate hose layer formed over the core hose layer and a first reinforcing layer. A second reinforcing layer is thereafter braided over the intermediate hose layer. Finally, a polymeric cover material is generally formed over the second reinforcing layer to complete the hose assembly.

The reinforcing layers of conventional power steering hose assemblies are generally applied by rotary braiding machines. Using these rotary braiding machines, strands of fiber or wire reinforcing material are wound upon the hose layers in an interwoven, braided pattern. Generally, the rotary braiding machines are configured to provide a braid pattern wherein the strands are successively passed over and under pairs of oppositely wound strands. This is referred to herein as a 2-over, 2-under braid pattern, which can seen in FIGS. 1 and 2. Power steering hoses known in the art utilize the 2-over, 2-under braid pattern in both the first and second reinforcing layers. In certain applications, it may be desired to further improve hose performance by varying the braid patterns, for example, to optimize burst strength, volumetric expansion, impulse life, or coupleability of the hoses.

The present invention provides methods and apparatuses for power steering hose designs for performance in high pressure and low to high volumetric expansion environments. Such power steering hose designs incorporate varying braid patterns in the reinforcement layers.

II. SUMMARY OF THE INVENTION

According to one aspect of the present invention, a new and improved power steering hose assembly is described, which may comprise a core hose layer, a first reinforcing layer, an intermediate hose layer, a second reinforcing layer and an outer hose layer. The first reinforcing layer has a braid pattern formed in a 1-over, 1-under pattern. The intermediate hose layer is positioned over the first reinforcing layer. The second reinforcing layer is disposed over the intermediate layer. The second reinforcing layer has a braid pattern formed in one of a 3-over, 3-under pattern or a 2-over, 2-under pattern. The outer hose layer is positioned over the second reinforcing layer.

Another object of the present invention is to provide a power steering hose assembly, wherein the intermediate hose layer may be a friction rubber layer.

Still, another object of the present invention is to provide a power steering hose assembly wherein the first reinforcing layer and the second reinforcing layer may be a nylon 6,6 fiber.

Further, another object of the present invention is to provide a power steering hose assembly wherein the core hose layer may be a chlorosulfonated polyethylene, a chlorosulfonated polyethylene/chlorinated polyethylene blend, a hydrogenated nitrile rubber or a nitrile rubber.

Yet, another object of the present invention is to provide a power steering hose assembly wherein the intermediate hose layer may be a chlorosulfonated polyethylene, chlorinated polyethylene, hydrogenated nitrile rubber or neoprene rubber.

Another object of the present invention is to provide a power steering hose assembly wherein the outer hose layer may be a chlorosulfonated polyethylene, chlorinated polyethylene, or hydrogenated nitrile rubber.

Further, another object of the present invention is to provide a power steering hose assembly wherein the hose has an inner diameter and an outer diameter, the inner diameter which may range from about 0.380 inches to about 0.395 inches and the outer diameter may be up to 1.000 inches.

Still, another object of the present invention may be to provide a power steering hose assembly wherein the 3-over, 3-under braid pattern may be formed by a 24 or 36 carrier configuration.

It is yet another object of the present invention is to provide a power steering hose assembly wherein the first reinforcing layer may be formed from a fiber material.

Another object of the present invention may be to provide a power steering hose assembly wherein the second reinforcing layer may be formed from a fiber material.

Yet, another object of the present invention is to provide a power steering hose assembly wherein at least one of the first and second reinforcing layers comprises reinforcing members may be formed from a plurality of strands of reinforcing material.

Still, another object of the present invention is to provide a power steering hose assembly which may further comprise an intermediate hose layer formed between the first and second reinforcing layers.

Further, another object of the present invention is to provide a power steering hose assembly wherein the first reinforcement layer may further comprise an extruded plastic layer.

Still, another object of the present invention is to provide a method of making a power steering hose, which may comprise the steps of forming a core hose layer; braiding a first reinforcing layer over the core hose layer in a 1-over, 1-under pattern; forming an intermediate hose layer over the first reinforcing layer; braiding a second reinforcing layer over the intermediate hose layer in one of a 3-over, 3-under pattern or a 2-over, 2-under pattern; and forming an outer hose layer over the second reinforcing layer.

Another object of the present invention is to provide a method of making a power steering hose, which may further comprise the step of using a plastic barrier as the first reinforcing layer.

It is yet another object of the present invention to provide a power steering hose, wherein the first reinforcement layer and/or the second reinforcement layer is a polyester yarn.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

IV. DETAILED DESCRIPTION OF THE INVENTION

Figure 1:
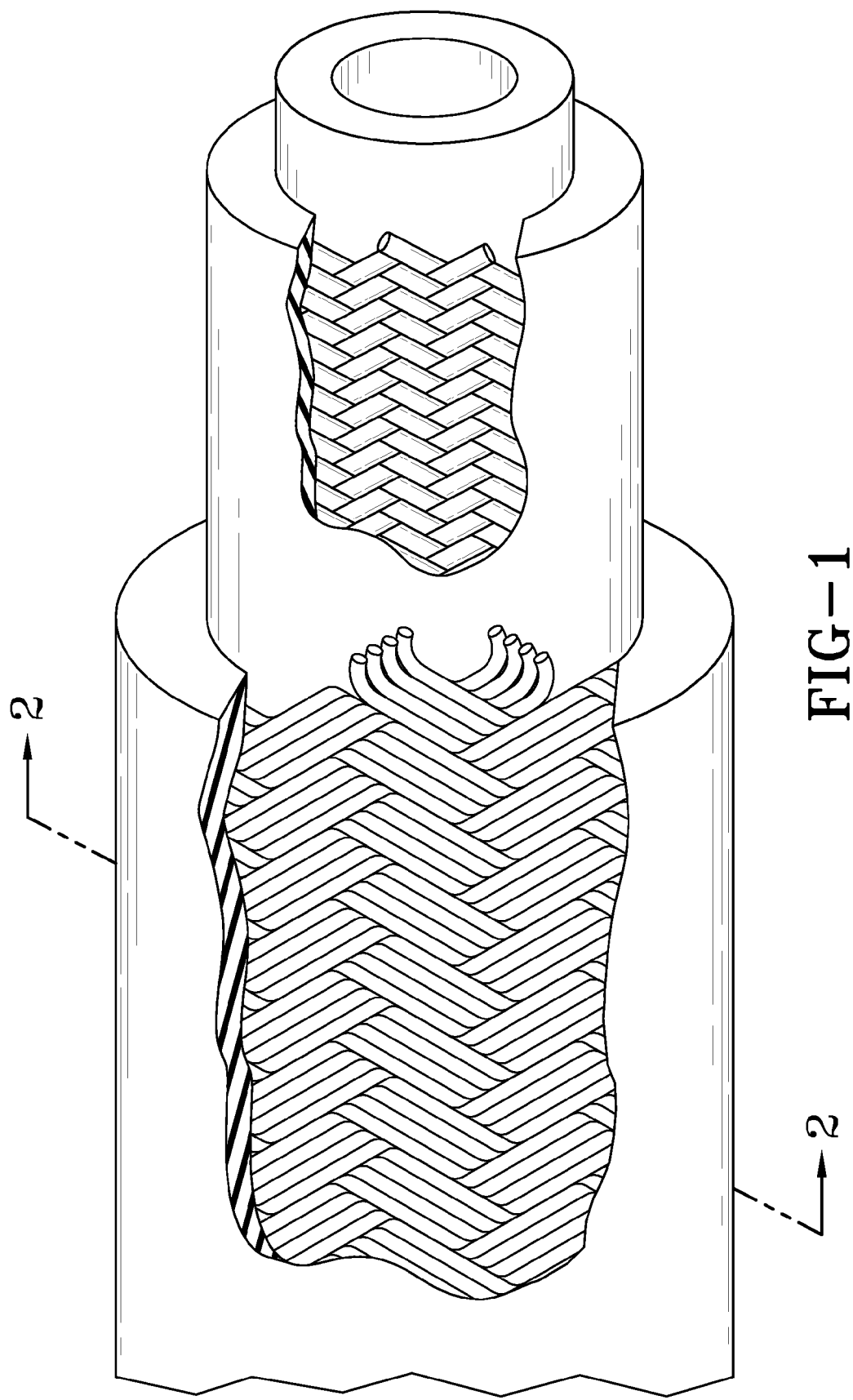
FIG. 1 is a perspective view of a power steering hose known in the art.
Figure 2:
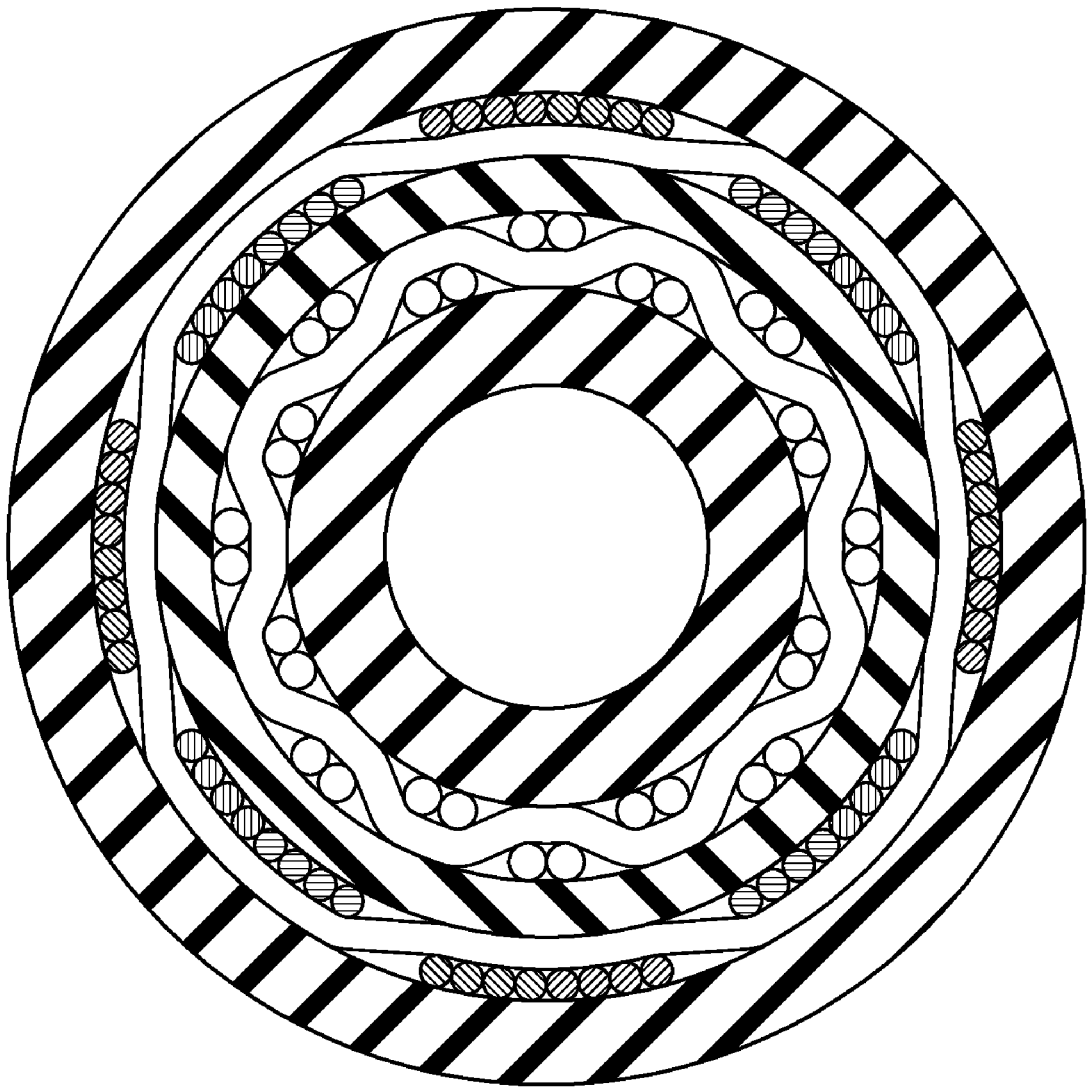
FIG. 2 is a cross section of FIG. 1 of a power steering hose known in the art taken along line 2-2.

Referring now to the drawings wherein the showings are for purposes of illustrating embodiments of the invention only and not for purposes of limiting the same, FIGS. 3-8 show the present invention.

FIGS. 3-8 illustrate a power steering hose assembly 10 according to the present invention. Generally, the power steering hose assembly 10 includes a core hose layer or tube 12, a first reinforcing layer 14, an intermediate hose layer 20, a second reinforcing layer 22 and an outer hose layer 30. The first reinforcing layer 14 has a braid pattern formed in a 1-over, 1-under pattern. The intermediate hose layer 20 is positioned over the first reinforcing layer 14. The second reinforcing layer 22 is disposed over the first reinforcing layer 14. As shown in the FIGURES, the intermediate hose layer 20 may be juxtaposed between the first reinforcing layer 14 and the second reinforcing layer 22. The second reinforcing layer 22 has a braid pattern formed in one of a 3-over, 3-under pattern or a 2-over, 2-under pattern. The outer hose layer 30 is positioned over the second reinforcing layer 22.

The core hose layer 12 may be formed from polymeric material that is suitable for use in transporting a fluid material for which the hose is intended to be used. Such use in a power steering hose may include high pressure environments as well as low to high volumetric expansion requirements. The core hose layer 12 may be made of chlorosulfonated polyethylene, a chlorosulfonated polyethylene/chlorinated polyethylene blend, a hydrogenated nitrile rubber or a nitrile rubber. Further, it may also be made of other polymeric material, such as but not limited to polychloroprene, chlorinated polyethylene acrylonitrile-budtadiene, styrene butadiene, polyisoprene, polybutadiene, ethylene-propylene-diene terpolymers, chlorinated polyethylene, or natural rubber polymers. Alternatively, the polymeric material may comprise thermoplastic elastomers such as propylene modified with ethylene-propylene rubber, such as Santoprene®, available from Monsanto Corporation; block polymers, such as the Kraton® line of polymers available from Shell Chemical Company; polyvinyl chloride, etc. These elastomers may be compounded with other filler, plasticizers, antioxidants, and cure systems to achieve particular properties desired for a given application, as known in the art.

The first reinforcing layer 14 is formed over the core hose layer 12 and comprises a plurality of first and second reinforcing members 16, 18 wound in opposite directions around and along the length of the core hose layer 12 in a braided pattern by a rotary braiding machine. The reinforcing members 16, 18 may comprise strands of fiber material, such as nylon, nylon 6-6 fiber, cotton, rayon, polyester, polyester yarn, polyvinyl alcohol, or other suitable fiber material. Alternatively, the reinforcing members 16, 18 may comprise strands of metallic material in the form of wire. The first and second reinforcing members 16, 18 of the first reinforcing layer 14 are braided in a pattern such that each first reinforcing member 16 crosses over an oppositely wound second reinforcing member 18, then passes under an adjacent, oppositely wound reinforcing member 18 in succession. This braid pattern is referred to herein as a 1-over, 1-under braid pattern. Further, the braid pattern may be in a 36 and/or 24 carrier configuration.

Figure 7:
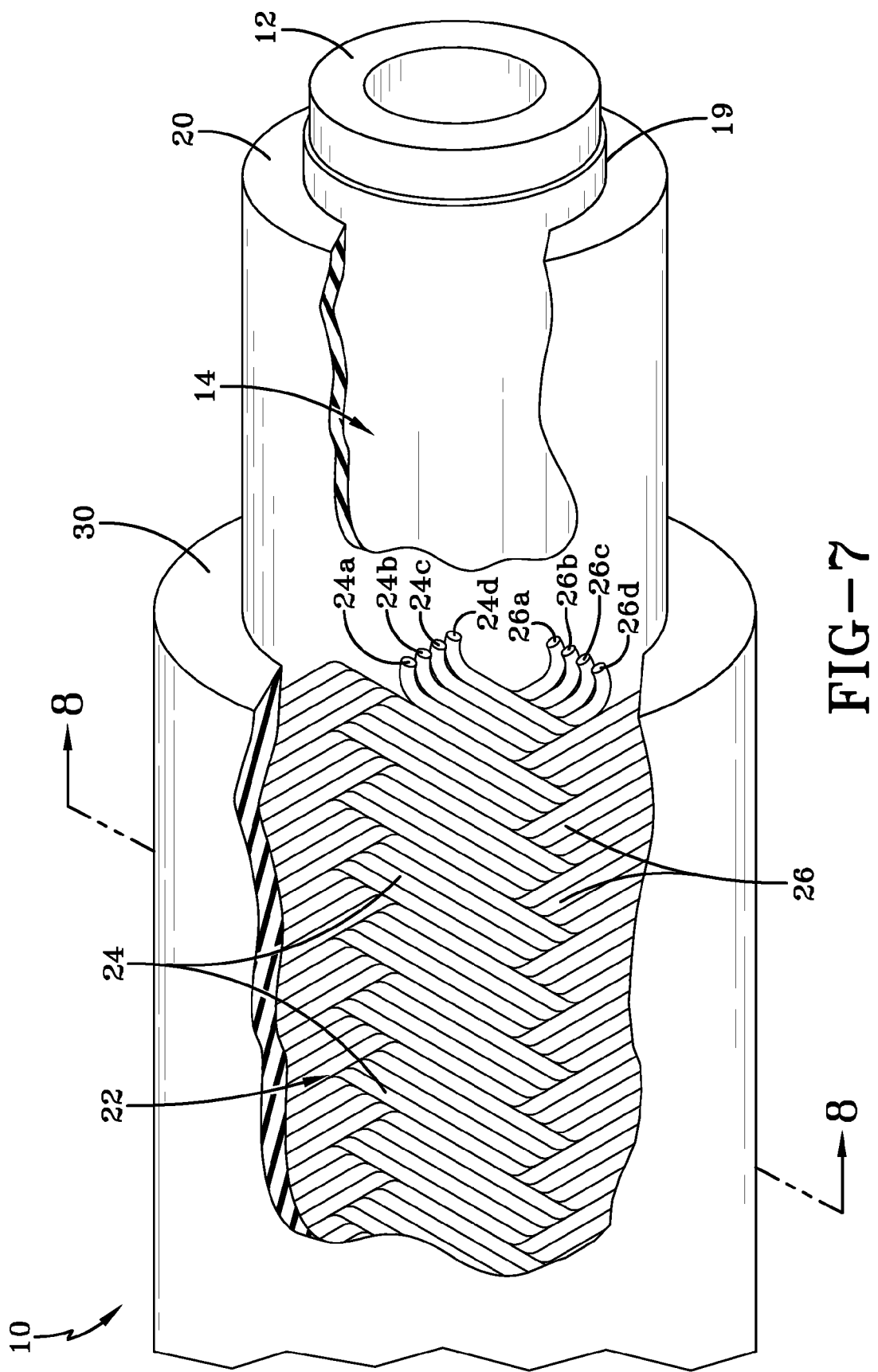
FIG. 7 is a perspective view of another embodiment of the present invention.
Figure 8:
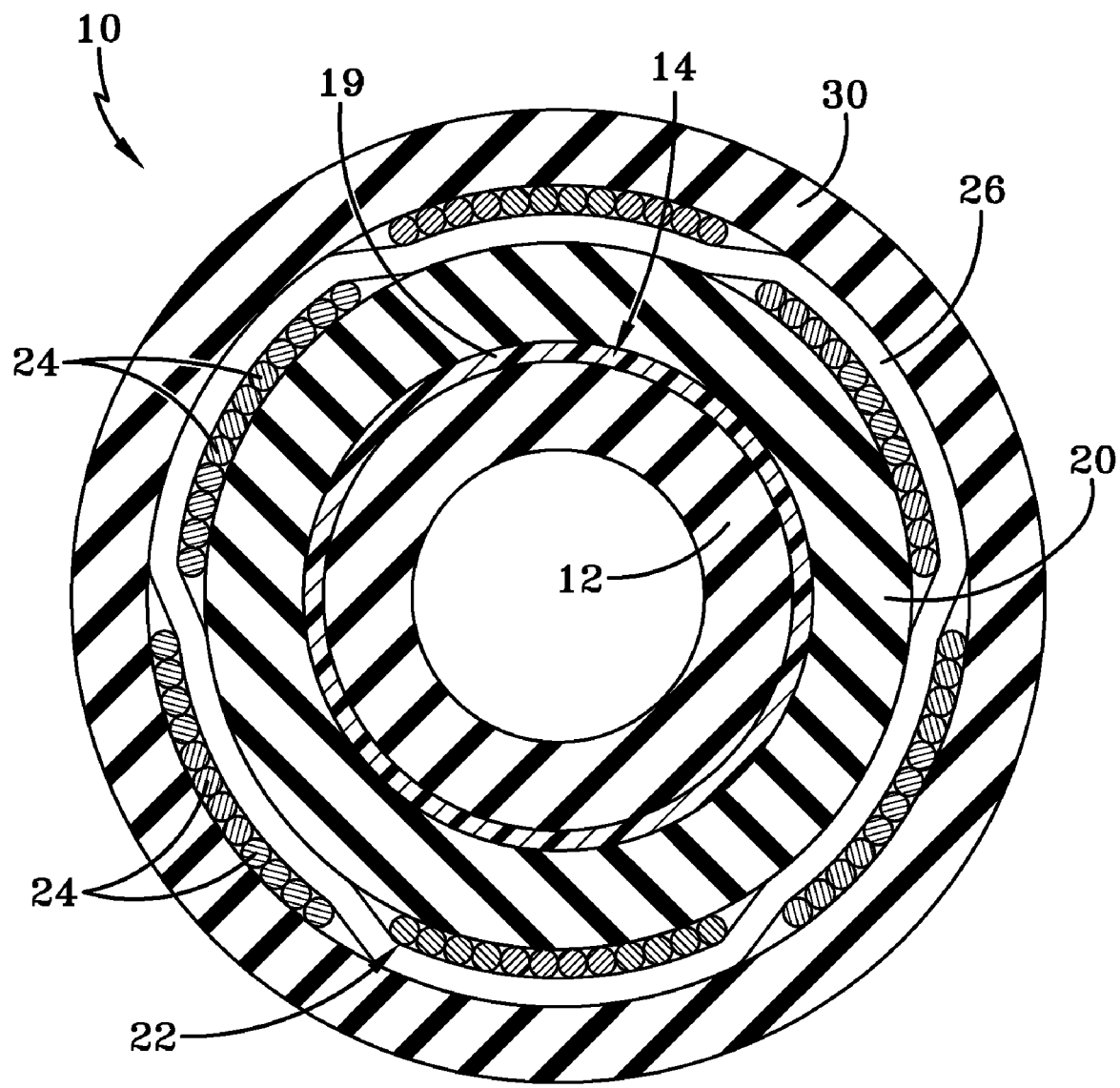
FIG. 8 is a cross section of FIG. 7 taken along line 8-8.

As shown in FIGS. 7 and 8, another embodiment of the present invention is shown. In this embodiment, the first reinforcing layer 14 may be a plastic barrier formed by extrusion over the core layer 12. The plastic barrier 19 may be any thermoplastic material that is heat and oil resistant. The plastic barrier 19 will eliminate pin holes, arrest crack growth through the tube, reduce the tube bulging under the hose crimp and evenly distribute pressure throughout the hose 10, which will result in longer impulse life. Further, the second reinforcing layer 22 may be a 3-over, 3-under braid pattern, which is in a 24 or 36 carrier configuration.

Power steering hose design must also meet the requirement for high volumetric expansion performance. Therefore, to incorporate the single braid and/or plastic barrier with single braid designs into a high volumetric expansion performance range, the 1-over, 1-under braid pattern may be utilized. This unique pattern maximizes the cross over density per unit length of hose. The result of this characteristic is volumetric expansion values which are 30 to 40% higher then hoses constructed with a standard braid pattern. This unique pattern will support the higher expansion performance while allowing for the incorporation of other reinforcements (polyester). The higher modulus polyester fiber will have improved abrasion resistance to support the 1-over, 1-under braid pattern and allow for improved impulse life with higher volumetric expansion performance.

The hose assembly 10, further includes the intermediate hose layer 20 formed over the first reinforcing layer 14, generally by extruding the intermediate hose layer 20 over the core hose layer 12 and first reinforcing layer 14. The intermediate hose layer 20 may be formed of polymeric material such as, but not limited to, chlorosulfonated polyethylene, chlorinated polyethylene, hydrogenated nitrile rubber or neoprene rubber. The second reinforcing layer 22 is then formed over the intermediate hose layer 20 and has first and second reinforcing members 24, 26 wound around and along the intermediate hose layer 20 in opposite directions, in the manner described above for the first reinforcing layer 14. The second reinforcing layer 22 is braided such that each first reinforcing member 24 passes successively over and under three of the oppositely wound second reinforcing members 26. This braid pattern is referred to herein as a 3-over, 3-under braid pattern. The second reinforcing layer 22 may be made from the same materials as the first reinforcing layer 14. The braid pattern, 3-over, 3-under weave creates a more flexible braid which improves the stress relieving characteristic of the second reinforcement layer 22. This unique characteristic results in 20 to 30% lower volumetric expansion hose values when compared to volumetric expansion values reported by standard pattern hose constructions. The lower expansion performance promotes longer impulse life.

In essence, the standard two-reinforcement layer design will produce superior volumetric expansion results and improves impulse life performance with the incorporation of braid patterns, 3-over, 3-under and 1-over, 1-under weaves. The 1-over, 1-under braid pattern of the first reinforcement layer 14 creates the higher expansion performance without negatively impacting impulse life. This new pattern within the inner braid will be supported by incorporating the 3-over, 3-under pattern in the second reinforcement layer 22. This pattern will minimize the inner braid movement and redistribute pressure more evenly throughout this reinforcement layer. Therefore, the resulting design will create a higher volumetric expansion hose with characteristics that will generate a longer impulse life.

The hose assembly 10 may further include an outer hose layer 30 formed over the second reinforcing layer 22, generally by extruding the outer layer 30 over the second reinforcing layer 22. The outer hose layer 30 protects the hose assembly 10 and is formed from a polymeric material suited for use in an application for which the hose assembly 10 will be used. As a non-limiting example, the outer hose layer may be formed from any of the various polymeric materials described above for the core hose layer 12, including but not limited to chlorosulfonated polyethylene, chlorinated polyethylene, or hydrogenated nitrile rubber.

Figure 3:
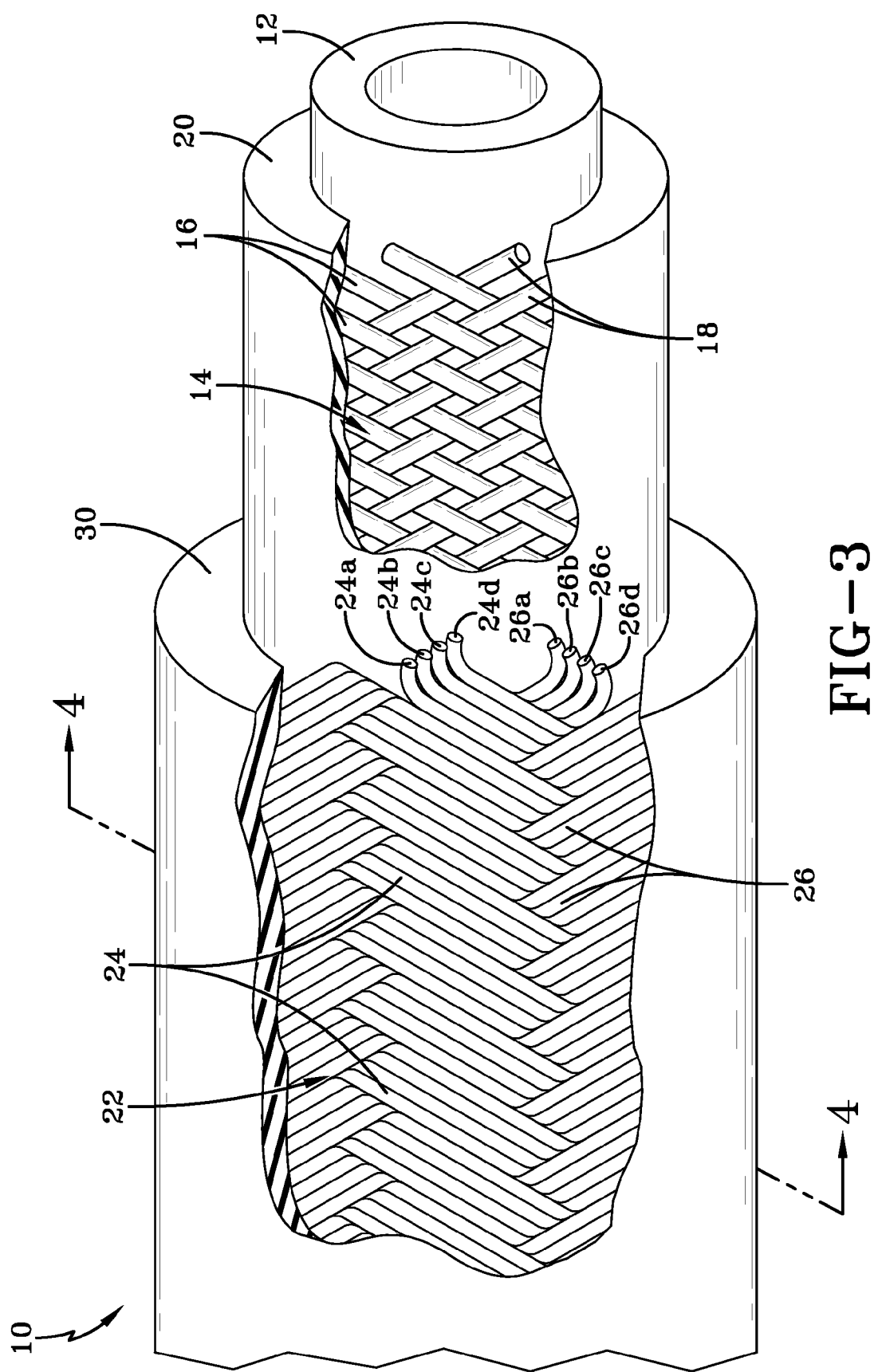
FIG. 3 is a perspective view of the present invention.
Figure 4:
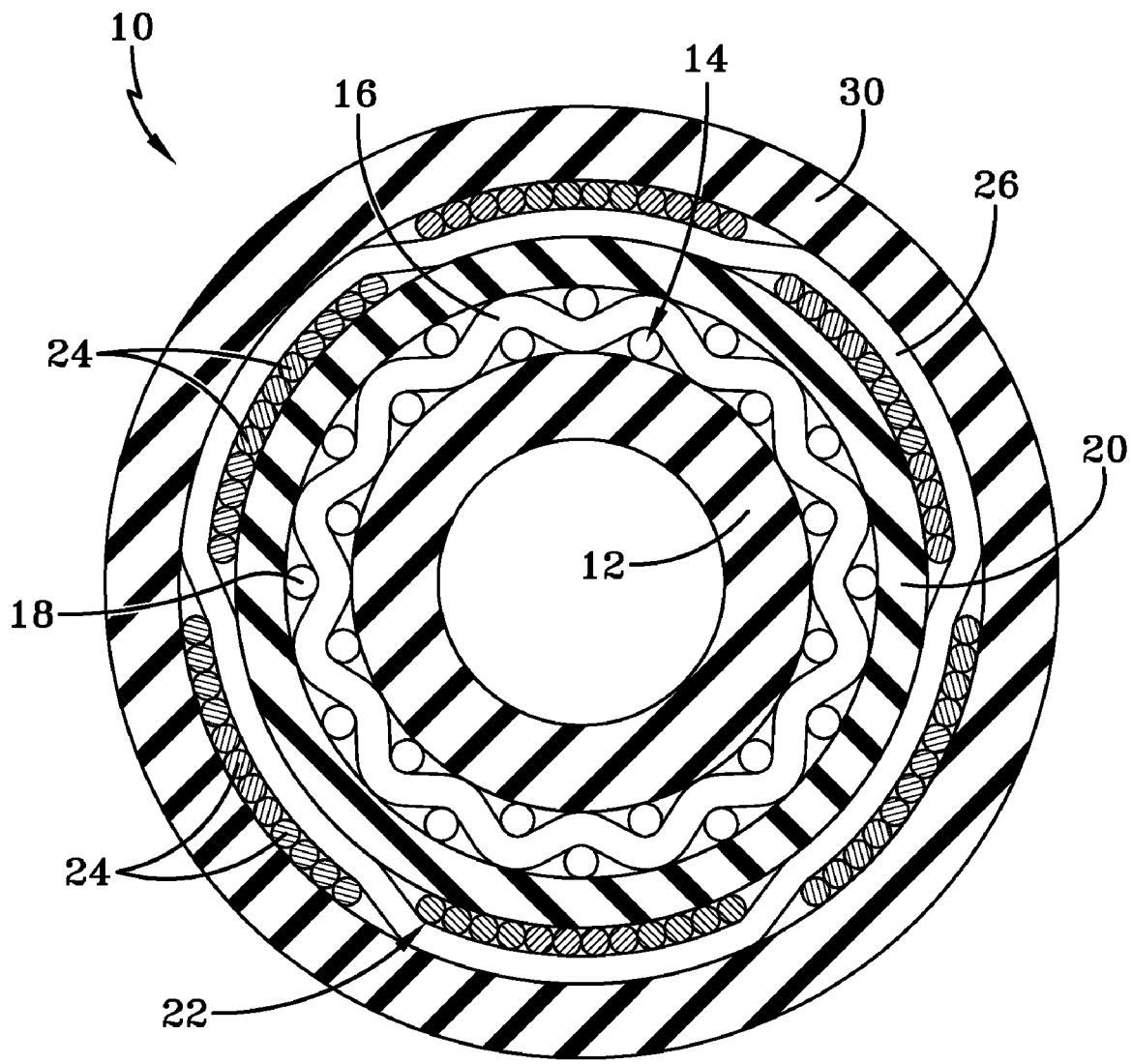
FIG. 4 is a cross section of FIG. 3 taken along line 4-4.
Figure 5:
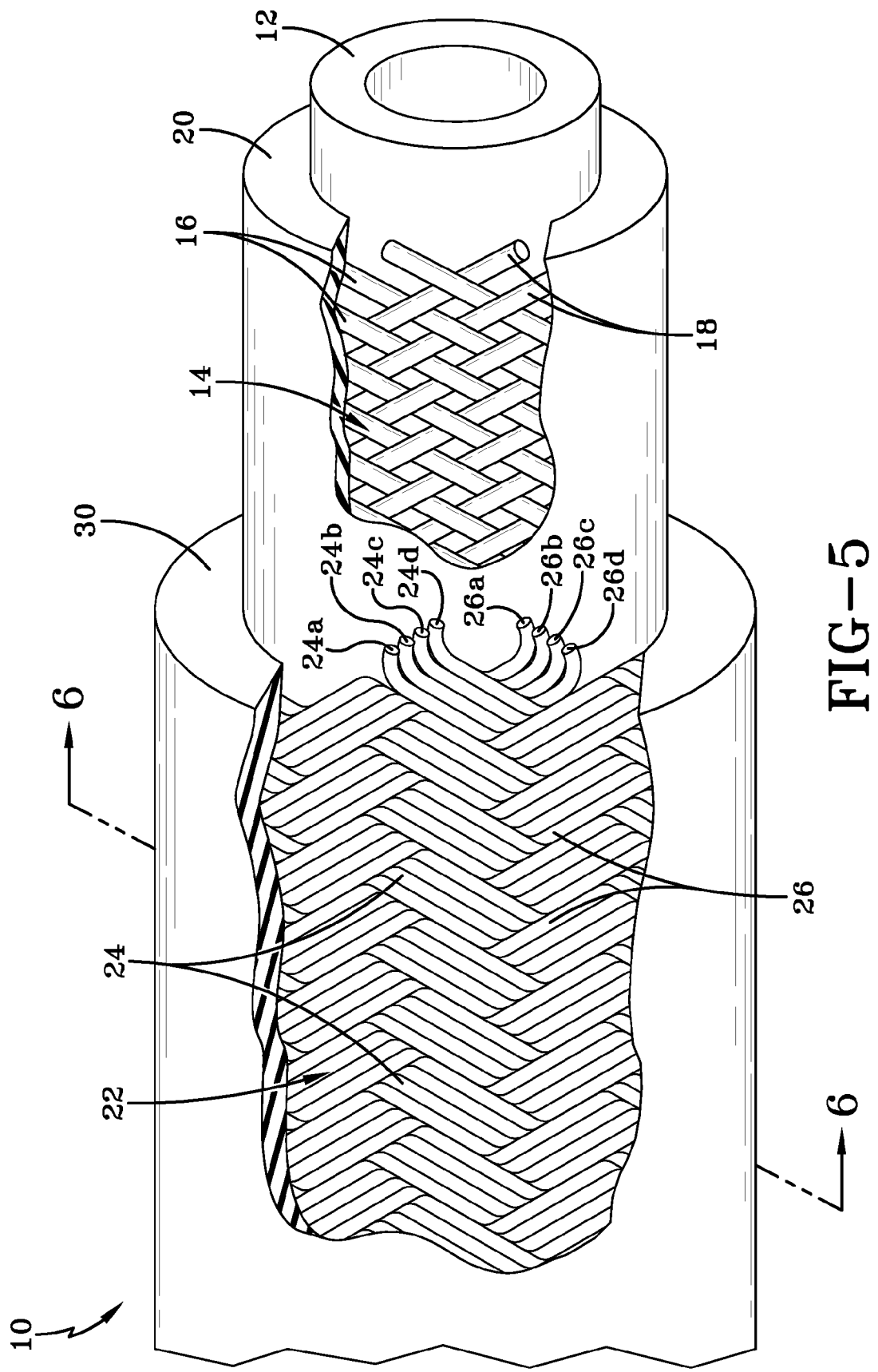
FIG. 5 is a perspective view of another embodiment of the present invention.
Figure 6:
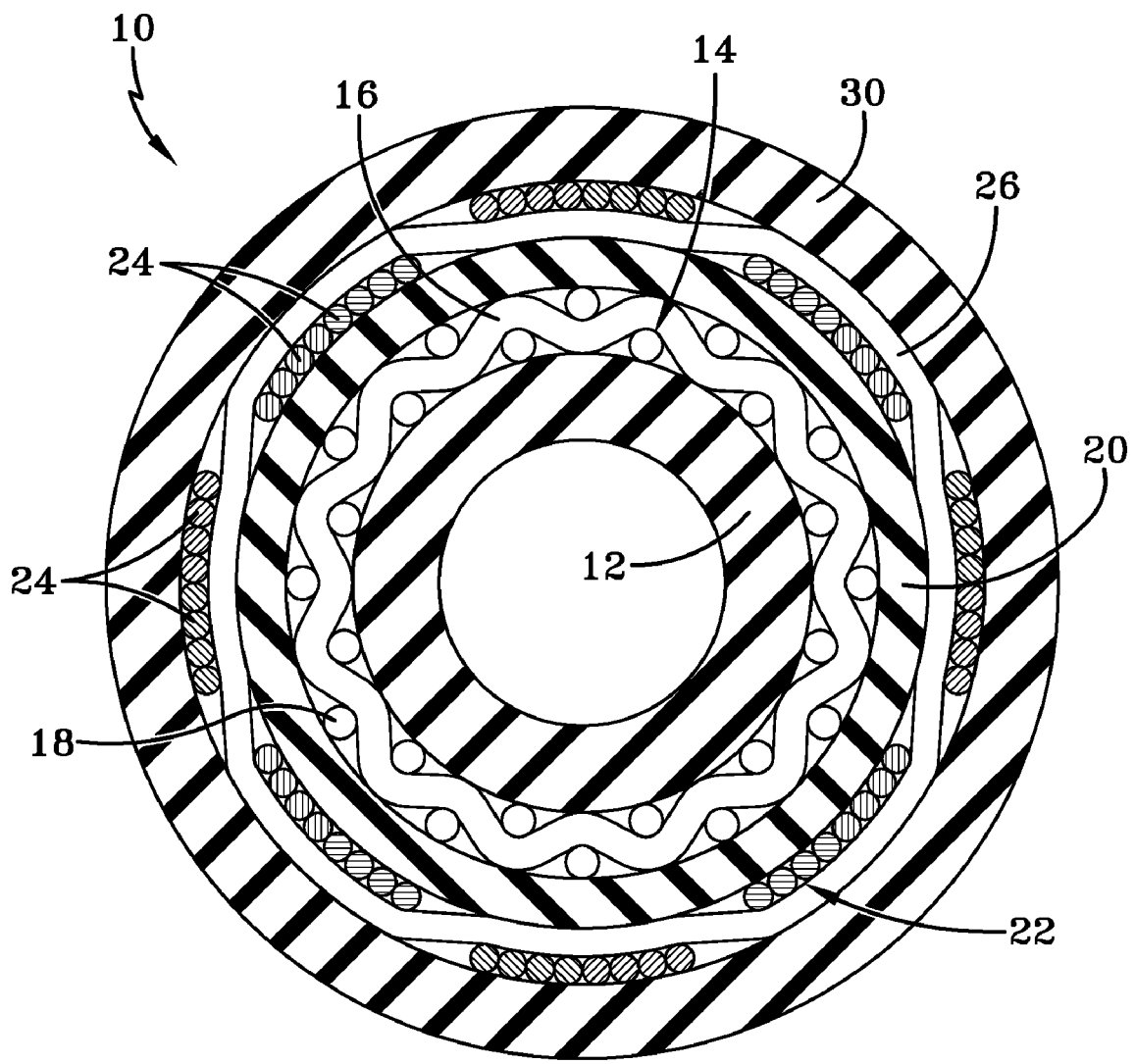
FIG. 6 is a cross section of FIG. 5 taken along line 6-6.

With continuing reference to FIGS. 3-6, the reinforcing members 16, 18, 24, 26 of the first and second reinforcing layers 14, 22 comprise single strands of fiber or wire material. Alternatively, each reinforcing member 16, 18, 24, 26 may comprise a plurality of strands. For example, FIG. 3 illustrates the 3-over, 3-under braid pattern wherein each of the first and second reinforcing members 24, 26 comprise three strands of fiber or wire material 24a, 24b, 24c and 26a, 26b, 26c.

Advantageously, the particular braid pattern combination desired may be selected to optimize various properties of the hose assembly 10, such as burst strength, volumetric expansion, impulse life, or coupleability. The desired braid pattern may be selected by adjusting a cam on the rotary braiding machine used to form the reinforcing layers 14, 22. In a rotary braiding machine, a cam and cam follower control the motion of a pivotable arm such that an end of the arm moves up and down to form the over-under patterns in the braid. To create the varied braid patterns, a small cam can be substituted for cam when it is desired to form a 1-over, 1-under pattern. Similarly, a larger cam may be substituted when it is desired to form a 3-over, 3-under braid pattern. Accordingly, the cams are relatively easily changed to alter the braid pattern formed by the machine, whereby the same machine may be utilized to create various braid patterns as discussed above.

The power steering hose of the present invention has many advantages over the prior art. The power steering hose improves impulse life without compromising volumetric expansion performance with the combination of braid patterns described above. polyester and/or nylon braid reinforcement layers, 36 carrier and/or 24 carrier braid configuration within the designs.

The hose design may comprise a single braid or a single braid with a plastic barrier, which will produce higher volumetric expansion values when compared to a two braid hose design. This higher volumetric expansion performance will result in lower impulse life of the designed hose. Therefore, to correct for the negative impact on volumetric expansion performance of the above mentioned designs, the incorporation of non-standard braid patterns in combination with existing nylon reinforcement and/or a polyester reinforcement and/or a braid configuration of 36 carriers and/or 24 carriers will result in equal or superior volumetric expansion performance in the above mentioned designs while promoting a longer impulse life. A single braid hose design will improve flexibility, NVH characteristics and impulse life. Maximizing the interaction between braid and crimp by eliminating the standard friction and secondary reinforcement layer will result in improved impulse life. In order for the unique braid pattern to support the single braid may require the incorporation of a 36 carrier configuration within the braid and the use of other reinforcement materials (polyester) to create the improved performance characteristics.

According to another aspect of the invention, a method of making a power steering hose 10, which may comprise the steps of forming a core hose layer. Next, the first reinforcing layer is braided over the core hose layer in a 1-over, 1-under pattern. Alternatively, if the first reinforcing layer is the plastic barrier, it is extruded over the core hose layer. The intermediate layer is formed. Next, the second reinforcing layer is braided over the intermediate hose layer in one of a 3-over, 3-under pattern or a 2-over, 2-under braid pattern. The last step of the method includes forming the outer hose layer over the second reinforcing layer.

The embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A power steering hose assembly, comprising:
a core hose layer;
a first reinforcing layer over said core hose layer, wherein said first reinforcing layer is a plastic barrier;
an intermediate hose layer over said first reinforcing layer;
a second reinforcing layer over said first reinforcing layer, said second reinforcing layer having a braid pattern formed in one of a 3-over, 3-under pattern or 2-over, 2-under pattern; and,
an outer hose layer over said second reinforcing layer.

2. The power steering hose assembly of claim 1, said first reinforcing layer having a braid pattern formed in a 1-over, 1-under braid pattern.

3. The power steering hose assembly of claim 1, wherein said second reinforcing layer is configured in a 3-over, 3-under braid pattern.

4. The power steering hose assembly of claim 3, wherein said second reinforcing layer is a 24 or 36 carrier configuration.

5. The power steering hose assembly of claim 1, wherein said core hose layer is chlorosulfonated polyethylene, a chlorosulfonated polyethylene/chlorinated polyethylene blend, a hydrogenated nitrile rubber or a nitrile rubber.

6. The power steering hose assembly of claim 1, wherein said intermediate hose layer is chlorosulfonated polyethylene, chlorinated polyethylene, hydrogenated nitrile rubber or neoprene rubber.

7. The power steering hose assembly of claim 1, wherein said outer hose layer is chlorosulfonated polyethylene, chlorinated polyethylene, or hydrogenated nitrile rubber.

8. The power hose steering assembly of claim 1, wherein said 1-over, 1-under braid pattern is formed by a 36 carrier configuration.

9. The power hose steering assembly of claim 1, wherein said first reinforcing layer is formed from a polyester yarn.

10. The power hose steering assembly of claim 1, wherein said second reinforcing layer is formed from a polyester yarn.

11. The power hose steering assembly of claim 1, wherein at least one of said first and second reinforcing layers comprises reinforcing members formed from a plurality of strands of reinforcing material.

12. A power steering hose assembly, comprising:
a core hose layer;
a first reinforcing layer over said core hose layer, wherein said first reinforcing layer further comprises an extruded plastic layer;
an intermediate hose layer over said first reinforcing layer;
a second reinforcing layer over said first reinforcing layer, said second reinforcing layer having a braid pattern formed in one of a 3-over, 3-under pattern or 2-over, 2-under pattern; and,
an outer hose layer over said second reinforcing layer.

13. The power hose steering assembly of claim 1, wherein said hose comprises an outer diameter, said outer diameter being up to 1.000 inches.

14. A method of making a power steering hose, comprising:
forming a core hose layer;
forming a first reinforcing layer over the core hose layer;
forming a plastic barrier over said core hose layer;
forming an intermediate hose layer over the first reinforcing layer;
braiding a second reinforcing layer over the intermediate hose layer in one of a 3-over, 3-under pattern or a 2-over, 2-under pattern; and
forming an outer hose layer over the second reinforcing layer.

15. The method of claim 14, wherein the step of forming a first reinforcing layer comprises the step of:
braiding said first reinforcing layer in a 1-over, 1-under braid pattern.

16. A power steering hose assembly, comprising:
a core hose layer;
a first reinforcing layer over said core hose layer, said first reinforcing layer being a plastic barrier layer;
an intermediate hose layer over said first reinforcing layer, said intermediate layer being a friction rubber layer;
a second reinforcing layer over said first reinforcing layer, said second reinforcing layer being a polyester yarn and having a braid pattern formed in one of a 3-over, 3-under pattern or a 2-over, 2-under pattern; and,
an outer hose layer over said second reinforcing layer.

* * * * *

UNITED STATES PATENT AND TRADEMARK OFFICE
CERTIFICATE OF CORRECTION

PATENT NO. : 7,614,428 B2
APPLICATION NO. : 11/616599
DATED : November 10, 2009
INVENTOR(S) : Henry et al.

It is certified that error appears in the above-identified patent and that said Letters Patent is hereby corrected as shown below:

Col. 5; Line 50, should read:

terns described above[.], polyester and/or nylon braid reinforce-

Signed and Sealed this

Sixteenth Day of February, 2010

David J. Kappos
*Director of the United States Patent and Trademark Office*